C. DE MEYER.
WATER LEVEL INDICATOR FOR IRRIGATION DITCHES AND THE LIKE.
APPLICATION FILED AUG. 29, 1917.
1,267,061.  Patented May 21, 1918.
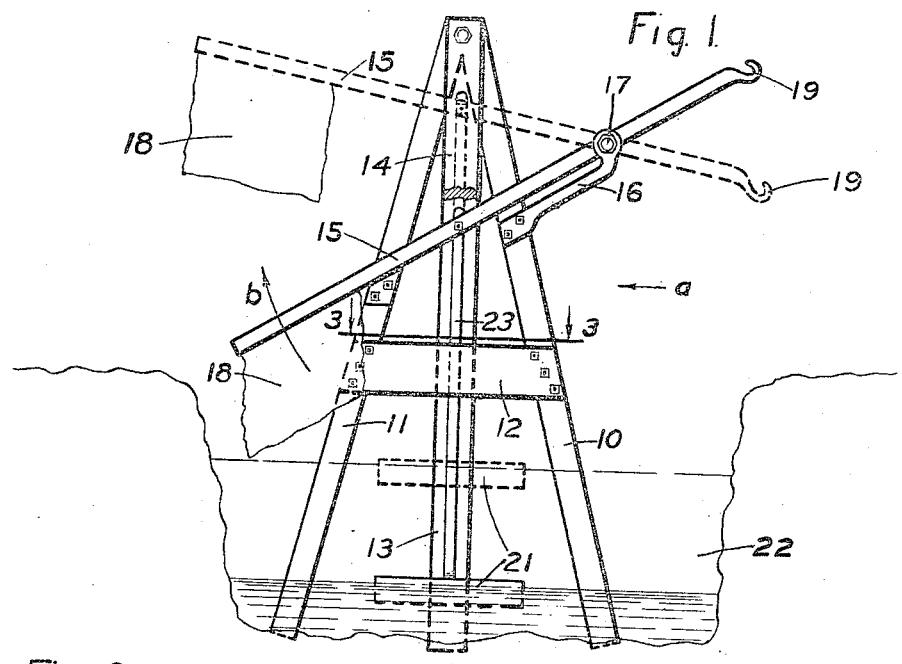
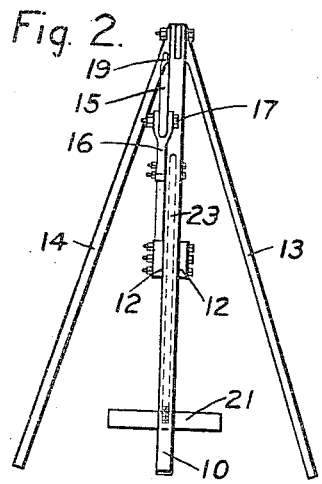
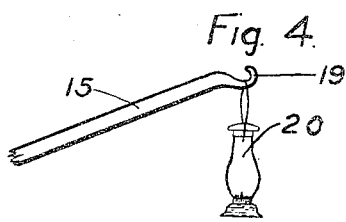
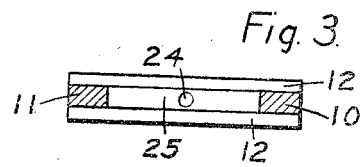
INVENTOR
CAMIEL DE MEYER
BY *Hazard & Miller*
ATTORNEYS

UNITED STATES PATENT OFFICE.

CAMIEL DE MEYER, OF BLYTHE, CALIFORNIA.

WATER-LEVEL INDICATOR FOR IRRIGATION-DITCHES AND THE LIKE.

1,267,061.  Specification of Letters Patent. Patented May 21, 1918.

Application filed August 29, 1917. Serial No. 188,838.

*To all whom it may concern:*

Be it known that I, CAMIEL DE MEYER, a citizen of the United States, residing at Blythe, in the county of Riverside and State of California, have invented new and useful Improvements in Water-Level Indicators for Irrigation-Ditches and the like, of which the following is a specification.

My object is to make a portable indicator for use in irrigation ditches, to show when the ditch is filled with water.

The invention is illustrated, by way of example, in the accompanying drawings in which:

Figure 1 is a view in side elevation illustrating the application of the indicator, particularly disclosing the extreme positions of the semaphore arm by solid and dotted lines.

Fig. 2 is a view in side elevation as seen looking in the direction of the arrow —$a$— in Fig. 1 and more particularly discloses the structure of the supporting frame.

Fig. 3 is a view in horizontal section and elevation as seen on the line 3—3 of Fig. 1 and discloses the guide frame provided for the float connecting rod.

Fig. 4 is a fragmentary view in elevation illustrating the lamp support formed as a part of the semaphore arm.

Referring more particularly to the drawings, 10 and 11 indicate supporting posts connected at their upper ends to form an A-frame and further connected mid-way their lengths by transverse frame members 12. At the upper ends of the posts 10 and 11 brace posts 13 and 14 are secured. These posts, as particularly shown in Fig. 2, extend diagonally from the top of the A-frame and terminate in the same plane as the ends of the A-frame posts. By this construction a pedestal is formed upon which a semaphore arm 15 is mounted. A bracket arm 16 is provided to secure the semaphore arm in pivotal relation to the A-frame, it having a pivot bolt 17 which passes through the bracket and the arm. One end of this arm is provided with a signal flag 18 while the opposite end is formed with a lantern hook 19 to receive a lantern 20 when desired. As will be understood, the semaphore arm is provided for vertical swinging movement, this being produced by the movement of the float 21 as it is raised and lowered upon the surface of the water within an irrigation ditch 22. Connection between the float and the semaphore arm is effected by a connecting rod 23 which extends vertically through an opening 24 in a guide block 25. This block is secured between the transverse frame members 12, as particularly shown in Fig. 3.

In operation, the pedestal, formed of the A-frame posts 10 and 11 and the brace posts 13 and 14, is placed in an irrigation ditch, as shown in Fig. 1. Primarily the float 21 will rest upon the floor of the ditch and the flag of the semaphore arm will hang downwardly in its lowermost position. As the water level in the ditch rises, the float 21 will be lifted, this acting through the connecting rod 23 to swing the semaphore arm upwardly in the direction of the arrow —$b$— in Fig. 1. When the semaphore has reached its uppermost position it will appear as indicated by dotted lines in Fig. 1 and will thus produce a visible signal which may be observed at a considerable distance. When the device is used after dark the lantern 20 may be lighted and hung upon the hook 19 and when lowered by the movement of the semaphore arm and its float, will indicate a filled condition of the ditch.

It will thus be seen that the device here disclosed is simple in its construction, direct in its operation, and affords an inexpensive indicator for use with irrigation ditches.

While I have shown the preferred construction of my water level indicator for irrigation ditches and the like, as now known to me, it will be understood that various changes in the combination, construction and arrangement of parts may be made without departing from the spirit of my invention as claimed.

I claim:

1. A portable indicator for irrigation ditches, comprising supporting posts connected at their upper ends, horizontal frame members mounted upon the supporting posts, brace posts connected midway of their ends to the upper ends of the supporting posts, a line connecting the brace posts being crosswise of a line connecting the supporting posts, a bracket extending outwardly from a supporting post near its upper end, a semaphore arm pivotally mounted upon the bracket, a signal carried by one end of the semaphore arm, a float and a connection between the float and the semaphore arm so that as the water rises in the ditch the float will go up and raise the signal.

2. A portable indicator, comprising a suitable pedestal adapted to be mounted vertically in an irrigation ditch, a bracket mounted upon the pedestal, a semaphore arm mounted upon the bracket, a signal carried by the semaphore arm, a guide block mounted upon the pedestal, a connecting rod extending through the guide block and connected to the semaphore arm, and a float connected to the connecting rod so that as the water rises in the ditch the float will go up, thereby raising the signal.

In testimony whereof I have signed my name to this specification.

CAMIEL DE MEYER.

Copies of this patent may be obtained for five cents each, by addressing the "Commissioner of Patents, Washington, D. C."